T. G. LEAVELL.
INDICATOR.
APPLICATION FILED MAR. 29, 1910.
971,052.
Patented Sept. 27, 1910.
4 SHEETS—SHEET 2.
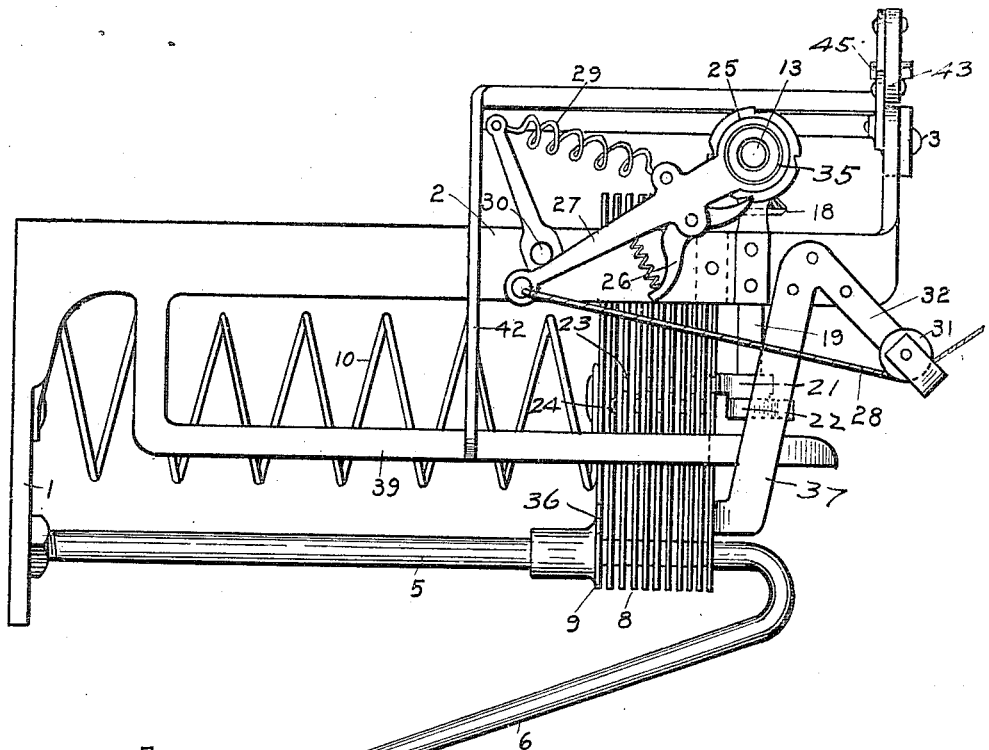
Fig. 2
Fig. 4
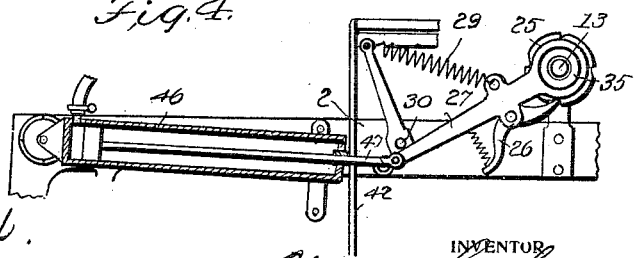
WITNESSES
C. A. Shedd.
F. C. Barry
INVENTOR
Thomas G. Leavell
BY
Max A. Schmidt
ATTORNEY T. G. LEAVELL.
INDICATOR.
APPLICATION FILED MAR. 29, 1910.
971,052.
Patented Sept. 27, 1910.
4 SHEETS—SHEET 3.
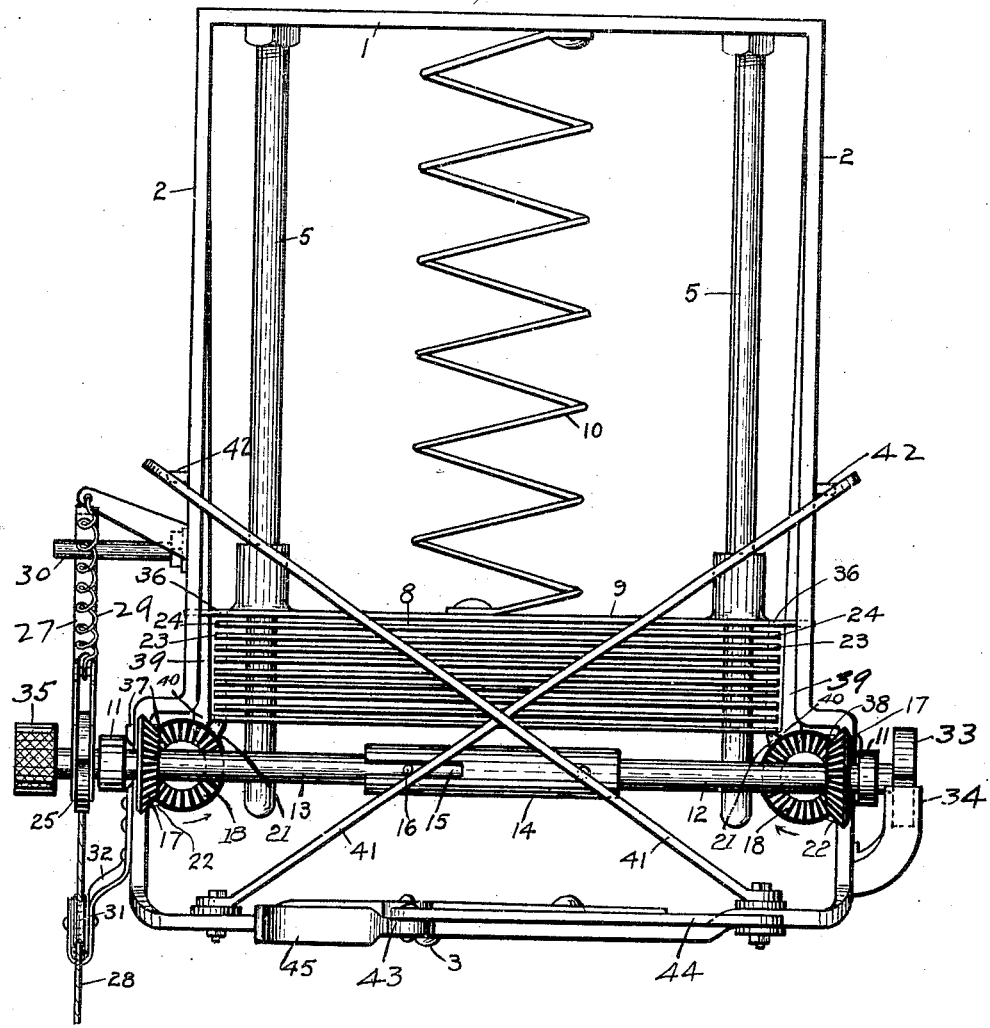
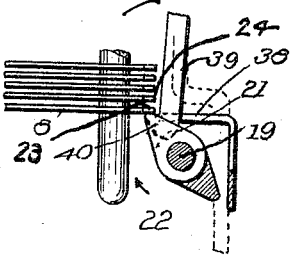

T. G. LEAVELL.
INDICATOR.
APPLICATION FILED MAR. 29, 1910.

971,052.

Patented Sept. 27, 1910.

4 SHEETS—SHEET 4.

WITNESSES
E. A. Shedd
F. E. Barry

INVENTOR
Thomas G. Leavell
BY
Max A. Schmidt
ATTORNEY

UNITED STATES PATENT OFFICE.

THOMAS G. LEAVELL, OF SPOKANE, WASHINGTON, ASSIGNOR OF THREE-FOURTHS TO A. KUNKEL, P. H. SHERMAN, AND E. C. LLOYD, ALL OF SPOKANE, WASHINGTON.

INDICATOR.

971,052. Specification of Letters Patent. Patented Sept. 27, 1910.

Application filed March 29, 1910. Serial No. 552,251.

*To all whom it may concern:*

Be it known that I, THOMAS G. LEAVELL, a citizen of the United States, residing at Spokane, in the county of Spokane and State of Washington, have invented certain new and useful Improvements in Indicators, of which the following is a specification.

This invention relates to indicators designed for street and other railways for displaying the names of the streets or stations when the car is approaching the same.

It is the object of the present invention to provide an indicator which also displays an advertisement or other matter, signs being provided which are charactered on both sides, one side displaying the name of the street or station, and each sign, after said display is made, displaying the advertisement or other matter on the other side, by a reversal of said sign.

The invention also has for its object to provide novel means for operating the sign as stated, together with means for enabling the same to be reset.

Another object of the invention is to provide an improved fluid-pressure apparatus for actuating the indicator, an obstacle-operated valve being provided which controls said apparatus.

Figure 1:
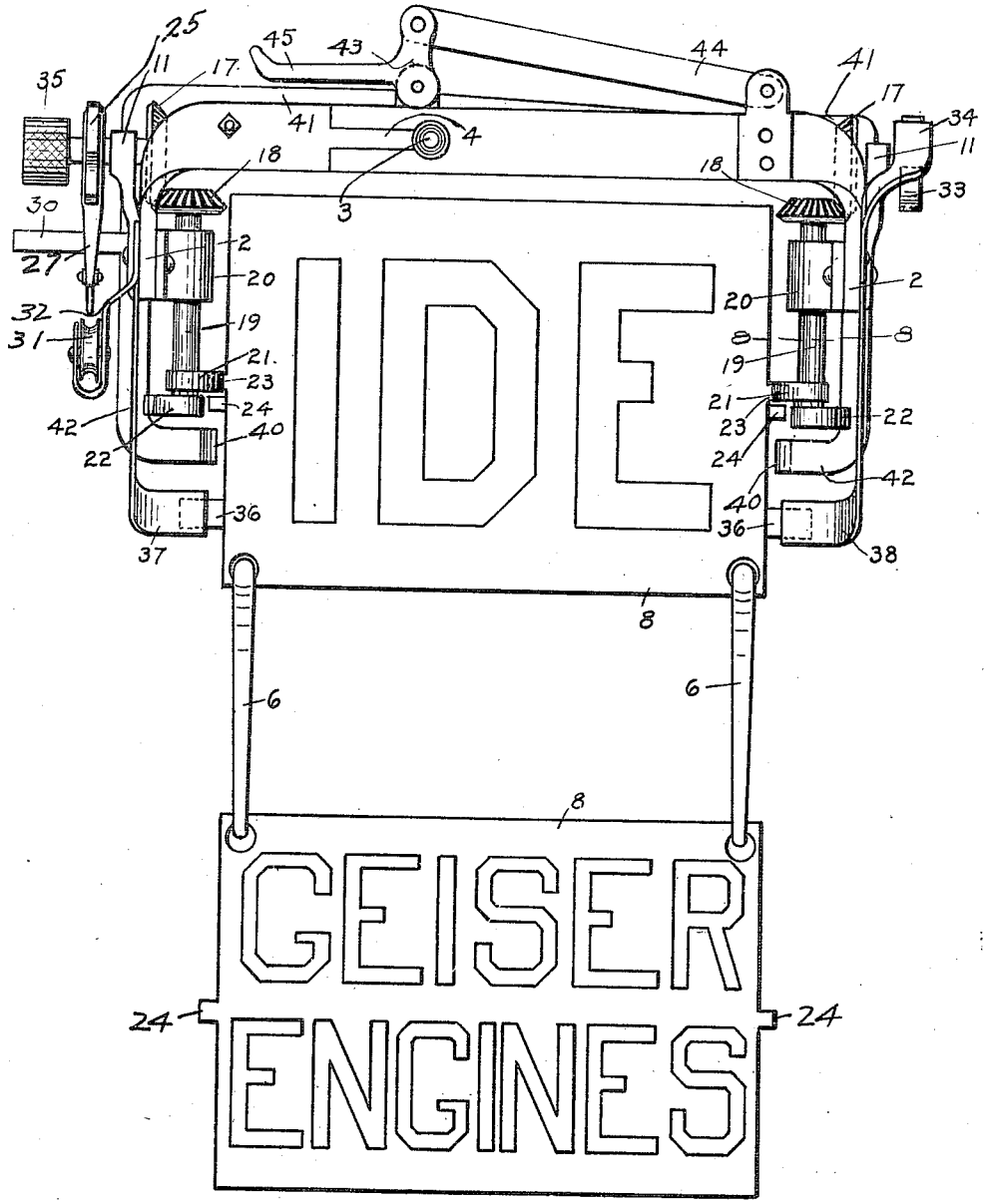
Figure 5:
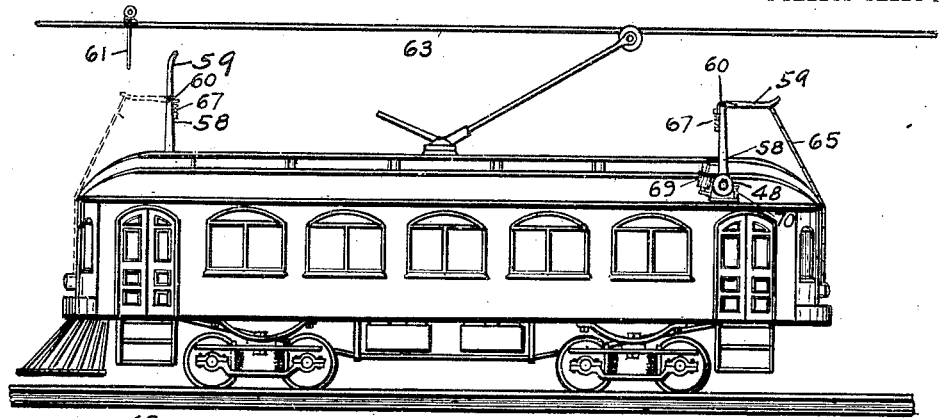
Figure 6:
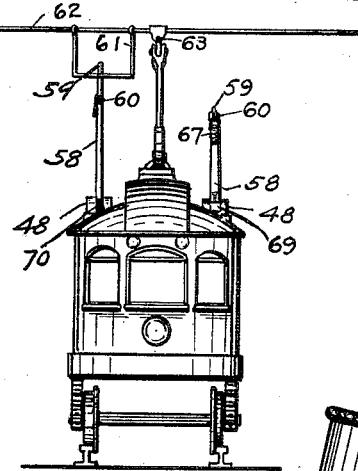
Figure 7:
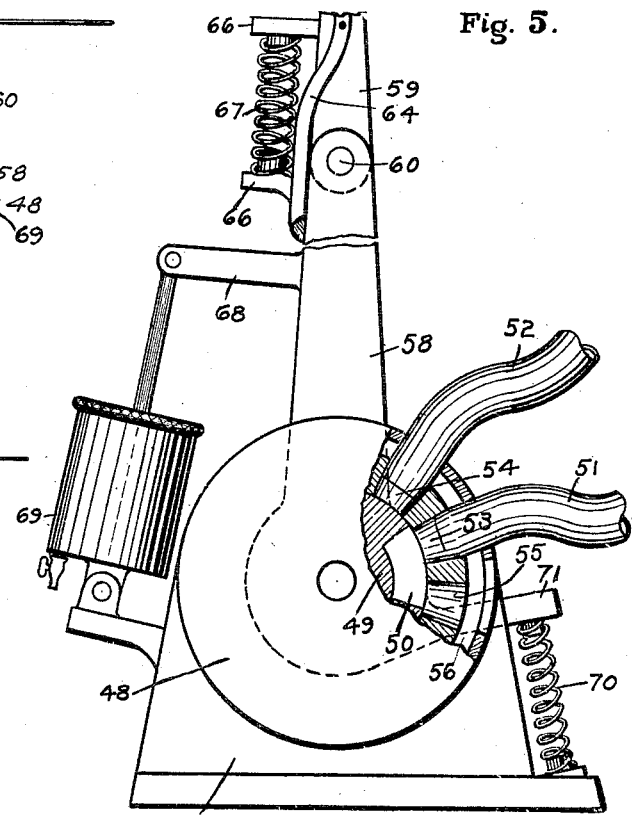

With these objects in view, the invention consists in a novel construction and arrangement of parts to be hereinafter described and claimed, reference being had to the accompanying drawings, in which:

Figure 1 is a front elevation of the indicator; Fig. 2 is a side elevation; and Fig. 3, a plan view; Fig. 4 is an elevation of a fragment of the indicator showing a different operating means, a fluid-pressure apparatus being provided; Fig. 5 is an elevation of a car showing the devices which control the fluid-pressure apparatus; Fig. 6 is an end view of the car, and Fig. 7 is an enlarged elevation of the valve, partly in section. Fig. 8 is a section on the line 8—8 of Fig. 1.

Referring more particularly to the drawings, the frame of the apparatus comprises a base plate 1 from which extend outwardly two spaced horizontal arms 2 having inturned extremities which overlap and are connected by a bolt 3, the connection being made a loose one by slotting one of the inturned portions, as indicated at 4, and passing the bolt through the slot. The purpose of this construction will be made clear hereinafter.

On the base plate 1 are mounted two outwardly extending spaced horizontal rods 5, said rods being located between the arms 2. The rods terminate in downwardly inclined rearward or return bends 6 having their ends turned up slightly as indicated at 7. On these rods are slidably mounted plates 8 containing the information to be displayed. The plates have eyes near their lower edges through which the rods loosely pass, and they are adapted to be shifted from the horizontal portions of the rods onto the inclined portions. Both sides of the plates are inscribed, one side containing the designation of the street or station, and the other side containing an advertisement or other matter. The outermost plate on the horizontal portion of the arms displays the street, and the outermost plate hanging on the inclined portions displays the advertisement. The plates, as they slide over the bend connecting the two portions of the arms flop over, so that each plate, after indicating the street, displays the advertisement. The plates are backed up by a spring-pressed follower 9, the spring 10 being interposed between the follower and the base plate 1. A detent is provided for releasing the plates, one after the other, to permit the follower to push them forwardly onto the bend, whereupon they flop over, and slide down the inclines into position to display the advertisement.

The arms 2 carry near their inturned ends, bearings 11 in which is journaled a horizontal shaft, said shaft extending transversely between the arms, and being in two sections, indicated at 12 and 13, respectively, the section 12 carrying a sleeve 14 within which the shaft section 13 telescopes. The sleeve has a slot 15 into which extends a pin 16 carried by the shaft section 13, whereby both shaft sections are made to rotate together. Each shaft section carries a bevel gear 17 which is in mesh with a bevel gear 18 on a vertical shaft 19, such a shaft and gearing being on each side of the apparatus. The shafts 19 are mounted in bearings 20 carried by the arms 2.

On the lower ends of the shafts are fingers 21 and 22 which extend in opposite directions and are located on the shaft, one above the other. On opposite edges of every other one of the plates 8 are lugs 23 into the path of which the fingers 21 are adapted to be extended, and the fingers 22 extend into the path of lugs 24 on opposite side edges of the remaining plates. Upon rotating the shafts 19, the plates are released in succession. Fig. 1 shows the fingers 21 engaging the lugs 23 of the outermost plate, said plate displaying the name of the street. When the next indication is to be made, the shafts 19 are given a half revolution, whereupon the fingers 21 swing away from the lugs 23 and release the plate which then drops forwardly and slides around the bend in the arms onto the inclined portions 6, the plate flopping over in going around the bend to display the advertisement on the reverse side upon coming to a stop on the inclines. Simultaneous with the release of the plate, the fingers 22 come into position in front of the lugs 24 of the next plate, thereby holding the other plates in position on the rods, and the next plate in position for release when the shafts 19 are again operated.

The mechanism for operating the shafts 19 comprises the following instrumentalities: On one end of the sectional shaft is made fast a ratchet wheel 25 which is engaged by a pivoted spring-pressed pawl 26 carried by a lever 27 loosely mounted on the sectional shaft so as to swing freely thereon. To the free end of the lever is connected a line 28 extending to the place from which the apparatus is to be actuated. A pull on the line swings the lever on the shaft, and through the pawl, imparts a rotary motion thereto, which motion is transmitted to the shafts 19 by the gears 17 and 18, whereupon the hereindescribed operation to release a plate takes place. A spring 29 connected at one end to the lever and at its other end to a stem mounted on one of the arms 2, returns the lever to its normal position, against a stop pin 30 carried by said arm 2, when the line is released. The line passes over a guide pulley 31 carried by a bracket arm 32 mounted on the arm 2. On the sectional shaft is also mounted a notched wheel 33 which is engaged by a spring pawl 34 to lock the shaft and prevent it from slipping back after it has been rotated by the pawl 26, and the lever 27 swings back to its normal position. The sectional shaft is also fitted with a knurled hand wheel 35 for manually operating it.

To prevent the follower 9 from being pushed forwardly over the bend when the last plate has been transferred to the inclines, lugs 36 are provided, said lugs being on the opposite side edges of the follower below the plane of the lugs 23 and 24. The bracket arm 32 has a branch 37 which extends into the path of the lug on one side of the follower. A finger 38 carried by the arm 2 on the other side of the apparatus, extends into the path of the lug on the other side of the follower. It will be evident from the foregoing that the forward movement of the follower is stopped when its lugs reach the parts 37 and 38, and come into engagement therewith.

From the lower edge of the arms 2 project spring fingers 39, said fingers extending forwardly, and having at their extremities barbs 40, adapted to extend in front of the outermost plate 8. These spring fingers are provided for the purpose of holding the plates when they are reset.

In order that the plates may be returned to the horizontal portions of the arms 2 after they have all been transferred to the inclines, the following devices are provided: To each of the inturned ends of the arms 2 is fastened a bar 41 extending rearwardly and terminating in downwardly extending portions 42 bent inwardly at their lower ends so as to come into contact with the spring fingers 39. The bars cross so that their ends engage the spring fingers on the opposite side of the apparatus to which the bars are fastened. It will therefore be evident that when the two arms 2 are spread, the spring fingers will be pushed inwardly toward each other, whereby the barbs 40 are placed in operative position.

To one of the inturned ends of the arms 2 is pivoted an angle lever 43 having one of its branches connected by a link 44 to the inturned end of the other arm 2. The lever is provided with a handle 45. Upon swinging the lever in one direction, the arms 2 are spread, and when the lever is swung in the opposite direction, the arms are drawn together. The loose connection between the inturned ends of the arms, and the sliding connection between the shaft sections 12 and 13 are provided in order that the arms may be manipulated as stated, they being slightly resilient for this purpose. After all the plates 8 have been transferred to the inclined portions of the arms 2, and it is desired to return them to the horizontal portions of said arms in order to reset said plates for the next trip, the arms are spread by means of the angle lever 43. This carries the fingers 21 and 22 out of the path of the lugs 23 and 24, and the plates may now be slid back on the horizontal portions of the arms. The arms are not spread far enough to disengage the parts 37 and 38 from the lugs 36, whereby the follower 9 is prevented from going forwardly too far. Simultaneous with the spreading of the arms, the spring fingers 39 are advanced, so that as each plate is reset the barbs 40 slip in front of the plate and hold the same from being pushed forwardly by the follower. There is sufficient resiliency in the fingers to enable the plates to slip past the barbed ends thereof. After the plates have all been replaced, the lever 43 is swung to draw the arms 2 together, thus placing the fingers 21 and 22 in operative position again, and at the same time permitting the fingers 39 to spring back and release the plates, the latter now being held by the fingers 21 and 22. The parts are now in position to successively release the plates, and transfer them to the inclines as already described.

Figs. 4 to 7 show a modification of the operating means, the object being to provide a device which will automatically act at each crossing to release a plate. This is effected by the mechanism which will now be described. On one of the arms 2 is pivotally mounted an air or other fluid-pressure cylinder 46 in which works a piston, the rod 47 of which is connected to the lever 27; the line 28 being dispensed with. On the roof of the car, at each end is mounted a cylindrical casing 48 in which is mounted a turning plug 49 having a recess 50 arranged to alternately place a supply pipe 51 leading to the cylinder 46, in communication with the air supply pipe 52, and the exhaust. The pipe 51 enters the cylinder and when in communication with the pipe 52 admits air into the cylinder to advance the piston working therein. When the pipe 51 is in communication with the exhaust, the cylinder exhausts, the piston being returned by the spring 29. The pipes 51 and 52 enter the casing 48 and are connected to ports 53 and 54, respectively, in the casing, said ports opening into the bore thereof in which the plug 49 works, said ports being so positioned relatively to the recess 50 that in one position of the plug the recess establishes communication between the ports 53 and 54, and in another position establishes communication between the port 53 and an exhaust port 55 opening into the bore of the casing and leading to an outlet channel 56 around said casing, the channel opening into the atmosphere.

The casing is supported on a stand 57 mounted on the roof of the car, and on the outside of the casing is an arm 58 which is connected to the plug 49 for turning the same. The outer end of the arm carries a finger 59 which is pivoted to the arm as indicated at 60. This finger is positioned so as to be struck by an obstacle 61 suspended from the supporting wire 62 of the trolley wire 63. It may be here stated that the fluid pressure apparatus is designed for use on electric railways, the air supply being obtained from the air-brake apparatus, or from any other source if the car is without such apparatus.

The finger 59 is adapted to swing on its pivot 60 in one direction only, it being prevented from swinging in the other direction by a clip 64 secured to the finger and engageable with one edge of the arm 58. The finger is pivoted in order that it may be lowered into inoperative position as shown to the right of Fig. 5. An actuating device is mounted on each end of the car on opposite sides thereof as shown in Fig. 6, so that the indicator may be operated with the car going in either direction, and also without turning around at the end of the route. The device not in use is placed in inoperative position by lowering the finger 59, a line 65 being attached thereto for this purpose, said line extending to the vestibule of the car, so as to be within reach of the motorman or the conductor.

From the arm 58 and the finger 59 project stems 66, between which is held a coiled spring 67 the function of which is to hold the finger normally in upright or operative position, and to return the same to this position when it has been swung downwardly into inoperative position.

On the arm 58 is a projecting stem 68 which is connected to the piston of a dashpot 69 carried by the stand 57 which acts as a cushion when said arm swings upon the finger 59 striking the obstacle 61.

The arm is normally held in upright position by means of a coiled spring 70 interposed between the base of the stand 57 and a projecting lug 71 on the arm. In this position, the cylinder is open to the exhaust, the recess 50 establishing communication between the ports 53 and 55.

The finger 59 of the device which is in operative position is free to swing only in the direction the car is traveling, so that when it is struck by the obstacle 61, the arm 58 is tilted rearwardly, whereupon the plug 49 is turned to position the recess 50 so that it establishes communication between the ports 53 and 54. Air then enters the cylinder 46, and the piston therein is advanced to actuate the indicator. When the finger clears the obstacle, the spring 70 returns the arm to its normal erect position, whereupon the plug is turned to open the cylinder to the exhaust.

I claim:

1. In an indicator, a series of charactered plates, a support on which the plates are slidably mounted, resilient arms located on opposite ends of the plates, an adjustable connection between the arms for spreading the same, means carried by the arms for holding the plates on the support, said means being operable to successively release the plates, and means for moving the plates off their support after they are released.

2. In an indicator, a series of charactered plates, a support on which the plates are slidably mounted, resilient arms located on opposite ends of the plates, said arms having inturned and loosely connected ends, an angle lever pivoted to one of said ends and connected to the other one of said ends, means carried by the arms for holding the plates on the support, said means being operable to successively release the plates, and means for moving the plates off their support after they are released.

3. In an indicator, a series of charactered plates, a support on which the plates are slidably mounted, resilient arms located on opposite ends of the plates, an adjustable connection between the arms for spreading the same, means carried by the arms for holding the plates on the support, said means being operable to successively release the plates, a shaft carried by the arms, and comprising slidably connected sections, said shaft being operatively connected to the holding means, and means for moving the plates off their support after they are released.

4. In an indicator, a series of charactered plates having lugs on opposite edges, the lugs of alternate plates being in different planes from the lugs of the other plates, a support on which the plates are slidably mounted, shafts located adjacent to the aforesaid edges of the plates, fingers projecting from the shafts in opposite directions, one finger being in the path of one set of the aforesaid lugs, and the other finger being in the path of the other set of lugs, means for rotating the shafts to remove one of the fingers from the lugs of one plate, and simultaneous therewith to engage the other finger with the lug of the next plate, and means for moving the released plate off the support.

5. In an indicator, a series of charactered plates, a support on which the plates are slidably mounted, means for holding the plates on the support, said means being operable to successively release the plates, means for moving the plates off their support after they are released, a support for the holding and releasing means, said support being adjustable to place said means into operative or inoperative position, means for holding the plates when the aforesaid holding and releasing means are in inoperative position, and means carried by the frame and engageable with the second-mentioned holding means for placing the same in operative position when the support is adjusted to place the first-mentioned holding and releasing means in inoperative position.

6. In an indicator, a series of charactered plates, a support on which the plates are slidably mounted, means for holding the plates on the support, said means being operable to successively release the plates, means for moving the plates off their support after they are released, a support for the holding and releasing means, said support comprising resilient arms located on opposite ends of the plates, an adjustable connection between the arms for spreading the same to place the holding and releasing means into inoperative position, means for holding the plates when the aforesaid holding and releasing means are in inoperative position, and means carried by the arms and engageable with the second-mentioned holding means when the arms are spread, for placing said holding means in operative position.

7. In an indicator, a series of charactered plates, a support on which the plates are slidably mounted, means for holding the plates on the support, said means being operable to successively release the plates, means for moving the plates off their support after they are released, a support for the holding and releasing means, said support comprising resilient arms located on opposite ends of the plates, an adjustable connection between the arms for spreading the same to place the holding and releasing means into inoperative position, means for holding the plates when the aforesaid holding and releasing means are in inoperative position, and crossed bars carried by the arms and engageable with the second-mentioned holding means when the arms are spread, for placing said holding means in operative position.

In testimony whereof I affix my signature in presence of two witnesses.

THOMAS G. LEAVELL.

Witnesses:
A. KUNKEL,
H. E. SMITH.